Aug. 22, 1961 E. REICH 2,997,359
TIME ESCAPEMENT MECHANISM FOR RECORDERS
Filed July 28, 1958 3 Sheets-Sheet 1

INVENTOR.
ERNÖ REICH
BY Mock+Blum
ATTORNEYS

Aug. 22, 1961   E. REICH   2,997,359
TIME ESCAPEMENT MECHANISM FOR RECORDERS
Filed July 28, 1958   3 Sheets-Sheet 2

INVENTOR.
ERNO REICH
BY
ATTORNEY.

United States Patent Office 2,997,359
Patented Aug. 22, 1961

2,997,359
TIME ESCAPEMENT MECHANISM FOR RECORDERS
Ernö Reich, 3 Dorottya utca, Budapest V, Hungary
Filed July 28, 1958, Ser. No. 751,540
Claims priority, application Hungary July 31, 1957
4 Claims. (Cl. 346—20)

The present invention relates to recording instruments and more particularly to such instruments used for recording the changes of the speed of railway and other vehicles.

In railway speed indicating and recording equipments, it is usual to measure the speed of the train by means of a wheel or gear rotating with a velocity proportional to the speed of the train in such a way that the angular displacement during a period of 0.6 sec. of this wheel is transmitted to the pointer and the writing arm. However, this apparatus has the drawback that the shaft of the clockwork defining the time unit is mechanically coupled, by means of cams, pawls, or toothed segments, to the pointer and to the writing arm. In addition, in consequence of the fact that the clockwork is wound up by a shaft turning with a speed proportional to the speed of the locomotive, the speed indicating and recording device is not started at zero speed but only at a speed which is as large as at least 10 to 15 percent of the maximum speed marked on the instrument. This is very disadvantageous, especially if the instrument is used for checking a run, because low speeds, say under 6 km./hour, and the zero speed, are not shown exactly.

The speed of the train is, in most cases, recorded as a function of the distance travelled and, if the train is standing, the tape of the recording device is moved as a function of time. For continuous time indication and for the moving of the tape with a speed which is a function of time, a separate clockwork is used which is wound up manually. However, as during speed recording, the clockwork moves the tape intermittently and the moment necessary for moving this tape is changing, a spare spring clockwork is not able to drive the tape exactly as required as a function of time.

The present invention eliminates these drawbacks, and consists chiefly in the use of a clockwork transmitting electrical impulses and having a switch operating cam disk on its main shaft, the cams of which operate a switch to open and close a circuit of an electromagnet according to a desired program, for the purpose of periodically energizing the electromagnet and thus controlling, by means of a resilient or elastic coupling, the clutch of the speed indicating device as well as to operate, by means of a rigid coupling, an arresting gear governing the desired operation of the indicating and recording organ. The rigid coupling further governs the clockwork showing the exact time, and driving of the tape which is moved as a function of time.

According to a further feature of the present invention, the electromagnet continuously winds up the impulse transmitting clockwork in periods of ⅓, ½, or 1 second.

An advantage of the invention is that, in vehicles and other instances where a storage battery is normally provided as a source of power for certain operations, this storage battery may be used to assure a continuously available supply of electric potential for energizing the impulsing relay, thus eliminating the necessity of an auxiliary clockwork mechanism. The impulsing relay controlled by the clockwork uniformly charges the driving spring of the clockwork regardless of changes in the mechanical load. Thus, exact timing of the relay energizing impulses can readily be attained by using a master or main clockwork mechanism by virtue of the fact that the tension of the driving spring thereof is always maintained at a constant value.

A further advantage of the invention is that the clockwork wound up by an electric motor or by a relay is able to operate any desired number of time indicators, time speed indicators, and recorders, so that these instruments may be dependably operated with very low costs.

Further details of the invention are described in connection with the accompanying drawing which diagrammatically shows one embodiment of the invention by way of example.

Figure 1:
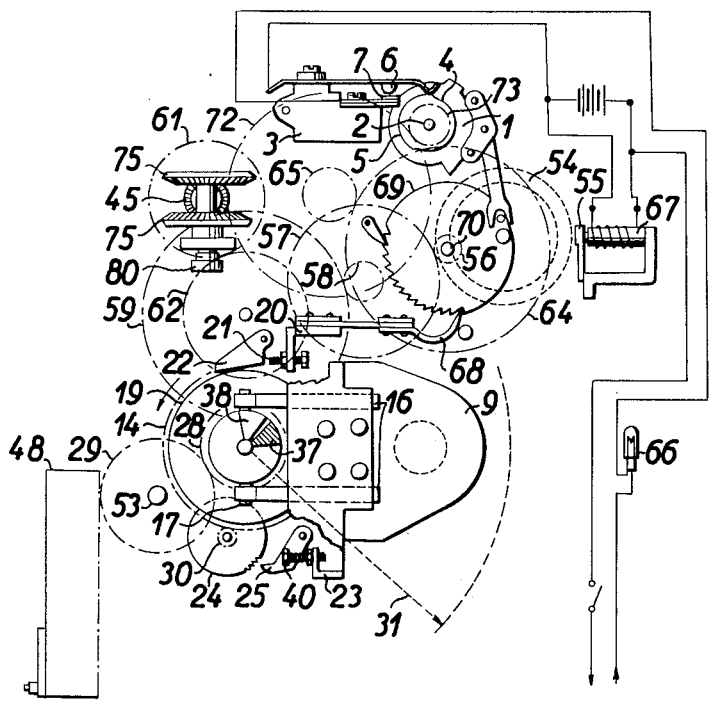
FIG. 1 is a view of the speed indicator, of the speed recorder and of the impulse transmitter, viewed from behind the scale, with a section of the claw-clutch along the line A—B shown in FIG. 2.
Figure 2:
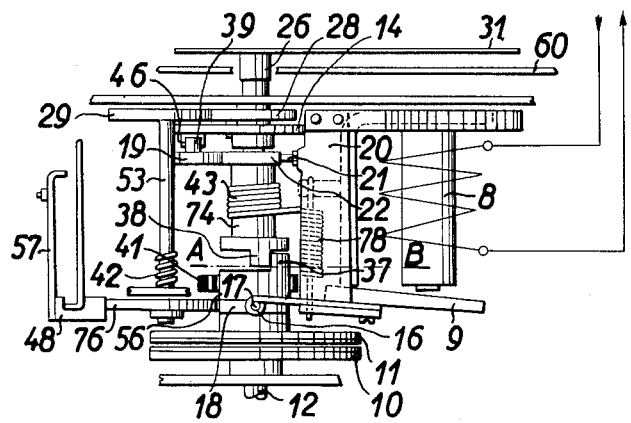
FIG. 2 is a plan view of the speed indicating and recording mechanism.
Figure 3:
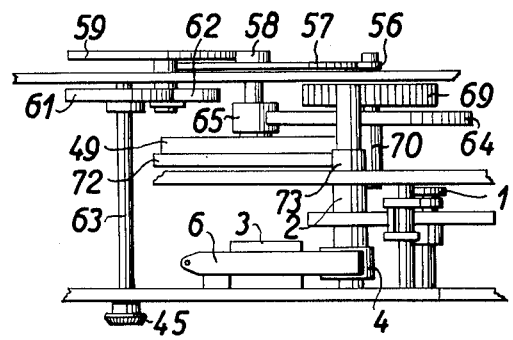
FIG. 3 is a plan view of the impulse transmitting clockwork, together with the device operating the time-indicator and moving the recorder tape as a function of the time.

The speed indicating and recording device according to the invention has two main parts: the impulse transmitting clockwork 1 and the electro-magnet 8. The clockwork 8 is of a well known construction and consists of escapement mechanism having a main shaft 2 to which is secured a cam disk 4 formed with a cam 5 for operating a switch 3. Shaft 2 makes one revolution per second and, in speed indicators, the length of cam 5 is so selected that it opens contacts 6 and 7 of switch 3 for 0.4 second, to open the energizing circuit of the electromagnet 8, and closes the contacts 6 and 7, to energize the electromagnet 8, for 0.6 second.

Electromagnet 8 has an armature 9 on which are a pair of resilient arms 16 engaged with radial pins 17 of a clutch collar 18. The armature 9 is pivoted intermediate its ends, and when electromagnet 8 is energized, the spring arms 16, through the pins 17 on clutch collar 18, engage a clutch disk 11, fixed on a sleeve 56, with a clutch disk 10 keyed onto a shaft 12. The latter is rotated at an angular velocity proportional to the speed of the vehicle and in the direction of the arrow of FIG. 1. Clutch disk 11 thus is turned, during each period of 0.6 second that the electromagnet 8 is energized, through an angle corresponding to the distance travelled by the vehicle during the same period.

During this movement of clutch disk 11 and its sleeve 56, an abutment 37 on sleeve 56 engages an abutment 38 on a braking disk 19 secured on the sleeve 74, and thus disk 19 is rotated through such angle in synchronism with clutch disk 11. If the speed during any 0.6 second interval is increased relative to that of the preceding interval of the same amount, an abutment 39 on disk 19 engages an abutment 46 on a gear 14 coaxial with disk 19 and rotates gear 14 to a position corresponding to the angular displacement made in such period of 0.6 second. Gear 14 is keyed to a sleeve 66 carrying the speed indicating pointer 31, and thus pointer 31 is moved in accordance with movement of gear 14. At the same time, and in a manner known to the art per se, gear 14 operates recording mechanism 57 through a gear 28 movable with gear 14 and engaging a gear 29 on a shaft 53 to which is fixed a gear 76 driving a rack 48.

When electromagnet 8 is de-energized at the end of the 0.6 second period, a spring 78 moves armature 9 in a direction to disengage the clutch disks 10 and 11. However, before the resilient pressure of arm 16 acting on these clutch disks is reduced to a value sufficient to release the disks from interengagement, a stop 21 on an arm 20 fixed to the armature 9 releases a spring biased braking pawl 22, and pawl 22 engages braking disk 19 to restrain the latter against reverse movement. Thereby, brake disk 19 cannot move reversely during the period of 0.4 second that the electromagnet 8 is de-energized. After pawl 22 is thus engaged with disk 19, a stop 40 on an arm 23 secured on armature 9 disengages a spring biased pawl 25 from a ratchet wheel 24. This ratchet wheel, by means of a pinion 30 rotatable therewith, prevents gear 14 from rotating in a reverse direction during the 0.6 second period that the electromagnet 8 is energized.

If during any 0.6 second period of energization of the electromagnet 8, the speed of the vehicle is decreased as compared to the speed during the immediately preceding period of energization, abutment 46 on gear 14 engages abutment 39 on brake disk 19 by virtue of the torque exerted on gear 19 by spring 42. As a result, pointer 31 and the recording mechanism 157 remains fixed in the new position for a period of about one second.

At the end of each 0.6 second period of energization of electromagnet 8, the clutch 10—11 is fully released so that disk 11 is reversely rotated to the position corresponding to zero speed, by means of a spring 41. At the end of the de-energization period of electromagnet 8, this period being 0.4 second, the stop 40 of armature 9 releases pawl 25 to engage ratchet wheel 24 to prevent reverse rotation of gear 14. Then pawl 22 is raised by stop 21 so that disk 19 is free to be rotated back to the zero position by its spring 43. During this interval, the resilient arms 16 are moved by the armature 9 with sufficient pressure to re-engage clutch disks 10 and 11 for a further period of 0.6 second.

The disc 19 acts like a ratchet wheel having an infinite number of teeth, and so is thus more advantageous than such a ratchet wheel, because there is no error introduced by the pitch of the teeth.

A pawl 68 is resiliently secured or pivoted to the arm 20 of armature 9 and is movable with this arm. Once each second, this pawl advances, by the pitch of one tooth, a ratchet wheel 69 having 30 teeth, so that wheel 69 makes two complete revolutions each minute. Wheel 69 is secured to a shaft 70 and, through a gear 56 on this shaft and gearing 57, 58, and 59 producing a ratio of 1:30, drives a time indicating pointer (not shown) at this reduced speed. Thereby the hours and minutes are shown on scale 60.

If the vehicle is motionless, a bevel gear 45 secured to a shaft 63 and meshing with a bevel gear 75, moves the recording tape, as a function of time, through a gear 80 in a well known manner. A gear 61 is secured to shaft 63 and is turned by a gear 62 driven by gear 59, thus turning the minute indicating hands on the shaft of gear 59. The shaft 63 makes one revolution per hour. The same gear train is used to move the device recording elapsed time in minutes.

The two revolutions per minute of the ratchet wheel 69 are utilized to wind up the driving spring located in the case 49 of clockwork 1. Gear 64, keyed to shaft 70, winds the clockwork spring by means of a gear 65, the gear ratio being 1:30. Thereby, the winding of the spring is effected during every cycle of movement of the armature of the electromagnet and to an extent corresponding to the amount the driving spring runs down during such cycle. Thereby, balance wheel 54 of the clockwork oscillates 360 times per minute under the influence of a constant spring 41. As the cam operated switch 3 maintains a constant frictional drag on the shaft 2 of the escapement wheel, and as the spring tension of the escapement mechanism 1 is also maintained constant as just described, a simple temperature compensating mechanism may be applied to the balance wheel to eliminate any errors caused by thermal expansion. Thus, the period of the impulsing of the electromagnet are always maintained substantially equal in each cycle. This assures a very accurate movement of the recording tape, so that this tape is advanced as a function of time, with an accuracy far in excess of that customary in instruments of this type.

Figure 4:
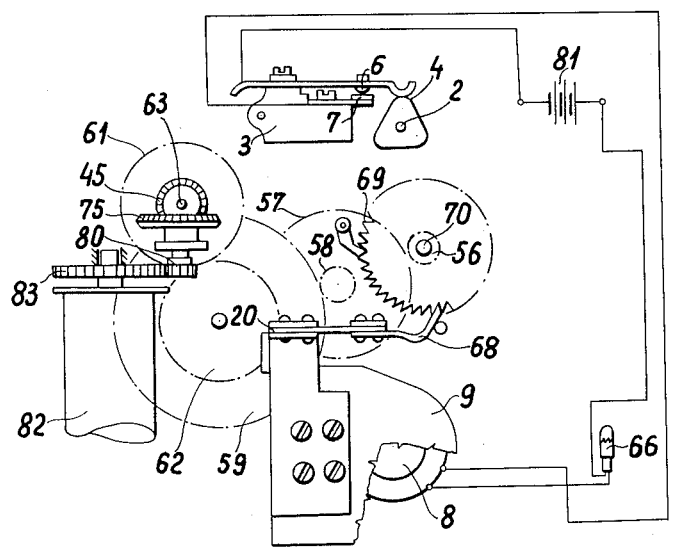
FIG. 4 is a schematic view illustrating more clearly certain of the components of the invention.

If the impulse transmitter is used only for indicating the time and for removing the recording tape, it is advantageous to make the disc 4 with three cams, as shown in FIG. 4, because thereby a relatively small electromagnet 8 is satisfactory. For example, in this three-cam arrangement an electromagnet consuming only 1 to 3 watts is adequate for producing the torque driving the recording instrument.

In order to assure that the spring of the clockwork 1 remains wound up in the event of failure of the electric power, a no-voltage or undervoltage relay 67 is provided. This relay has an armature 55 which, when the relay 67 is de-energized due to power failure, or excessive voltage drop, engages the balance wheel 54 and maintains it motionless. Actually, armature 55 engages wheel 54 if the normal operating voltage decreases by about 30 percent. When the voltage again attains its normal value, armature 55 disengages wheel 54 and the clockwork is automatically started. The circuit of the electromagnet 8 is advantageously stabilised by means of a hydrogen-iron-resistance 66.

The clockwork 1 is a sensitive and delicate device and it is often subject to a rough handling, dust, fumes etc., so that, according to this invention, the clockwork 1 is put in a hermetically closed casing 49, and is driven by a separate electromagnet 8 or by an electric motor. Thus only the outlet wires are outside the casing and are subject to external influences.

Experiments have shown that the electro-mechanical recording instrument described in the foregoing may easily be made as a robust and long lasting equipment including a recorder and an indicating device which functions with the dependability required for railway vehicles.

I claim:

1. A time escapement mechanism for recording instruments comprising, in combination, a driving spring; an escapement wheel; a main output shaft secured to said escapement wheel; a source of electric potential; winding means for said spring; an impulse relay having a movable armature operable, upon each energization of the relay, to impulse said winding means; switch means connected between said source and said relay and operable, when closed, to effect energization of said relay, said switch means including a rotatable element on said shaft operable, during a rotation of said shaft, to periodically effect energization of said relay; and an undervoltage relay in circuit connection with said source and having an armature operable, upon a predetermined decrease in the potential of said source, to engage and restrain against movement a movable component of said escapement mechanism.

2. A time escapement mechanism as claimed in claim 1 in which the rotatable element of said switch assembly comprises a cam shaped in accordance with a predetermined desired program of the electrical impulses produced by closure of said switch.

3. A time escapement mechanism as claimed in claim 1 in which said movable component comprises the balance wheel of the escapement mechanism.

4. A time escapement mechanism as claimed in claim 1 including an hermetically sealed housing enclosing all the components of said time escapement mechanism; and conductors connected to said switch means and brought through said housing in a gas tight manner and connected to said impulse relay.

References Cited in the file of this patent

UNITED STATES PATENTS

| | | |
|---|---|---|
| 1,723,228 | Burnham | Aug. 6, 1929 |
| 2,168,628 | Richardson | Aug. 8, 1939 |
| 2,326,246 | Nicholides | Aug. 10, 1943 |
| 2,801,896 | Krahulec | Aug. 6, 1957 |
| 2,828,179 | Poncelet | Mar. 25, 1958 |